US009588661B1

United States Patent
Jauhal et al.

(10) Patent No.: US 9,588,661 B1
(45) Date of Patent: Mar. 7, 2017

(54) GRAPHICAL USER INTERFACE WIDGET TO SELECT MULTIPLE ITEMS FROM A FIXED DOMAIN

(71) Applicant: EMC Corporation, Hopkinton, MA (US)

(72) Inventors: Shern Jauhal, Palo Alto, CA (US); Lena Protasov, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 236 days.

(21) Appl. No.: 14/284,298

(22) Filed: May 21, 2014

(51) Int. Cl.
  *G06F 3/0484* (2013.01)
  *G06F 3/0481* (2013.01)
  *G06F 3/0482* (2013.01)
  *G06F 3/0485* (2013.01)
  *G06F 3/0487* (2013.01)

(52) U.S. Cl.
  CPC ........ *G06F 3/04842* (2013.01); *G06F 3/0482* (2013.01); *G06F 3/0485* (2013.01); *G06F 3/0487* (2013.01); *G06F 3/04817* (2013.01)

(58) Field of Classification Search
  CPC ............. G06F 3/04842; G06F 3/04817; G06F 3/0482; G06F 3/0485; G06F 3/0487
  USPC ....................................................... 715/765
  See application file for complete search history.

(56) References Cited

U.S. PATENT DOCUMENTS 8,589,354 B1   11/2013 Roche et al.
8,812,960 B1 *  8/2014 Sun .................... H04L 61/6077
                                                                705/7.13
2008/0055269 A1 *  3/2008 Lemay .................. G06F 3/0482
                                                                345/173
2013/0111365 A1 *  5/2013 Chen ........................ H04L 51/10
                                                                715/756
2013/0179836 A1 *  7/2013 Han ....................... G06F 3/0482
                                                                715/810

OTHER PUBLICATIONS

CheckboxList, Legato GEMS 3.1.1, Aug. 2005, 1 page.
Ordered Multi Select List, Legato GEMS 2.0, Jun. 2001, 1 page.
"CheckedListBox Item Check event, Gartner BI Magic Quadrant," 2009, 2 pages, java2s.com, downloaded from http://www.java2s.com/Code/CSharp/GUI-Windows-Form/CheckedListBoxItemCheckevent.htm on May 3, 2014.
Jacob Lefore, "How to use CheckBox Control in ASP.net," 2014, 4 pages, Computer Programming, downloaded from http://dotprogramming.blogspot.com/2013/08/how-to-use-checkbox-control-in-aspnet.html on May 3, 2014.

(Continued)

*Primary Examiner* — Jennifer To
*Assistant Examiner* — John Repsher, III
(74) *Attorney, Agent, or Firm* — Blakely, Sokoloff, Taylor & Zafman LLP

(57) ABSTRACT

Disclosed is a method for operating a graphical user interface (GUI). In an edit state, the GUI allows a user to select multiple items from a fixed domain of items that represents a total set from which selections may be made. In a rest state, the GUI allows the user to easily recognize which of the items from the fixed domain are currently selected. In the rest state, the items currently selected are displayed in a read only mode such that user input relative to the items displayed is ignored.

24 Claims, 5 Drawing Sheets

(56) References Cited

OTHER PUBLICATIONS

"Get selected items in a Checkbox List in vb.net," Oct. 22, 2011, 3 pages, AuthorCode, downloaded from http://www.authorcode.com/get-selected-items-in-a-checkbox-list-in-vb-net/ on May 3, 2014.

"jQuery Dropdown Check List," 3 pages, Adrian Tosca, downloaded from http://www.gcooler.com/uploadfile/favorites/demo/dropdown-check-list.0.9/demo.html on May 3, 2013.

"CheckedListBox Item Check event, QlikView BI Dashboard," 2009, 2 pages, java2s.com, downloaded from http://www.java2s.com/Code/CSharp/GUI-Windows-Form/CheckedListBoxItemCheckevent.htm on May 3, 2014.

"Jdeveloper,Oracle ADF & Java, Using Multiple Selection (selectManyListbox & selectManyCheckbox component) in ADF," Dec. 21, 2013, 5 pages, downloaded from http://oracleadf-java.blogspot.com/2013/12/using-multiple-selection.html on May 3, 2014.

"List box," Jul. 24, 2013, 1 page, Wikipedia, downloaded from http://en.wikipedia.org/wiki/List_box on May 12, 2014.

\* cited by examiner

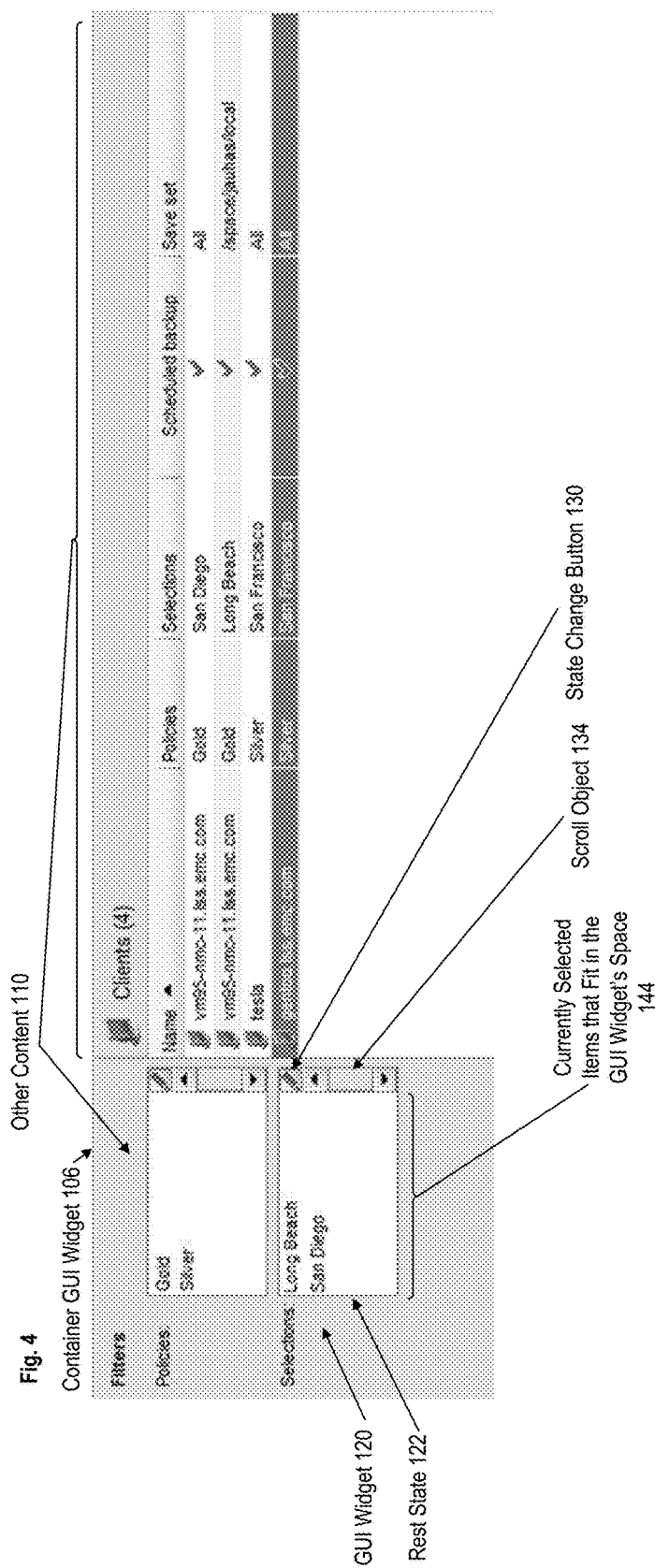

GRAPHICAL USER INTERFACE WIDGET TO SELECT MULTIPLE ITEMS FROM A FIXED DOMAIN

FIELD

Embodiments of the invention relate to the field of graphical user interfaces; and more specifically, to graphical user interface widgets to select multiple items.

COPYRIGHT NOTICE/PERMISSION

The present description includes material protected by copyrights, such as illustrations of graphical user interface images. The owners of the copyrights, including the assignee of the present invention, hereby reserve their rights, including copyright, in these materials. The copyright owner has no objection to the reproduction by anyone of the patent document or the patent disclosure, as it appears in the Patent and Trademark Office file or records, but otherwise reserves all copyrights whatsoever. Copyright EMC Corporation 2014.

BACKGROUND

A graphical user interface (GUI) is a type of user interface that allows users to interact with electronic devices through visual indicators displayed on one or more electronic visual displays. The actions in a GUI are usually performed through direct manipulation of the graphical objects (or elements) by the user. A GUI is often comprised of GUI widgets (also referred to as visual widgets or widgets). Some GUI widgets support interactions with the user (e.g., labels, buttons, and check boxes) through manipulation of the GUI widgets, while others act as containers that group GUI widgets added to them (e.g., panels, windows, and tabs) and/or include other content for presentation.

A widget toolkit (also referred to as a widget library or GUI toolkit) is a set of GUI widgets for use in designing applications with GUIs. A widget toolkit itself is a piece of software which is usually built on top of an operating system, windowing system, or window manager and provides programs with an application programming interface (API), allowing them to make use of the GUI widgets. Widget toolkits can be either native or cross platform.

A windowing system (or window system) is a type of GUI which implements the WIMP (windows, icons, menus, pointer) paradigm (wherein the pointer is also referred to as the cursor). Often, each currently running application is assigned a usually resizable and usually rectangular shaped area to present its graphical user interface to the user. Usually a window decoration is drawn around each window. A windows manager is system software that controls the placement and appearance of windows within a windowing system; this software works in conjunction with the underlying graphical system that provides required functionality—support for graphics hardware, pointing devices, and a keyboard, and are often written and created using a widget toolkit (windows themselves are often considered widgets). Thus, the programming of both, the window decoration and of available GUI widgets inside of the window is eased and simplified through the use of widget toolkits.

Some other types of GUIs have icons, and perhaps menus, but may do not use a pointer and/or run programs in windows (or in windows without window decorations)— these are sometimes referred to as post-WIMP user interfaces (e.g., touch-screen-based operating systems such as iOS manufactured by Apple® of Cupertino, Calif. and Android manufactured by Google® of Mountain View, Calif.). Such GUIs, rather than using windows, often use the display area of the electronic visual display available for applications to show the output of a single, currently selected application. These GUIs also often support styles of interaction using more than one finger in contact with a display, which allows actions such as pinching and rotating. Still other GUIs support both WIMP and post-WIMP simultaneously, and may use the display area of the electronic visual display available for applications to show the output of multiple, currently selected applications using a form of screen splitting (e.g., Windows® 8.1 from Microsoft® Corporation of Redmond Wash.).

Many GUIs are implemented with software relying on a model-view-controller (MVC) architecture, which divides the software into three interconnected parts, so as to separate internal representations of information from the ways that information is presented to or accepted from the user. A first part, the model, consists of application data, business rules, logic, and functions. A view can be any output representation of information, such as a chart or a diagram. Multiple views of the same information are possible. The third part, the controller, accepts input and converts it to commands for the model or view. A model-view-controller allows for a flexible structure in which the GUI is independent from and indirectly linked to application functionality, so the GUI can be easily customized. This allows the user to select or design a different skin at will, and eases the designer's work to change the interface as the user needs evolve.

Regardless of the type of GUI, a given space at a location within the display area of the electronic visual display (which may be all of the display area) may be allocated to a GUI widget; and where that given space is too small, the entire GUI widget and/or the entire content of the GUI widget will not be visible at one time (typically, the user scrolls in order to change which parts of the GUI widget and/or its contents are currently visible). As previously described, one or more GUI widgets (referred to as "internal" GUI widgets) may be placed inside another GUI widget (referred to as a "container" GUI widget). Where one or more GUI widgets are put inside another GUI widget, the one or more "internal" GUI widgets are each provided a space at a location within that "container" GUI widget; and while at least some part of an internal GUI widget is visible, the space at the location provided that internal GUI widget corresponds to a space at a location within the display area of the electronic visual display. Thus, the visible part (which may be all) of a given internal GUI widget is visible at a space at a location within the display area of the electronic visual display.

A popup is a type of GUI widget that covers part of what was being displayed immediately prior to the popup GUI widget being displayed (e.g., a pop-up window, which typically has a window decoration; a pop-up menu). Popup GUI widgets are intended to be sufficiently disruptive to draw the user's attention to the popup GUI widget.

A dialog box (or dialogue box) is a type of GUI widget used to communicate information to the user, prompt the user for a response, or both. Dialog boxes are classified as "modal" or "modeless", depending on whether or not they block interaction with the software that initiated the dialog.

A checkbox (also referred to as a check box, tickbox, or tick box) is a type of GUI widget that permits the user to make a binary choice (i.e. a choice between one of two possible mutually exclusive options). Checkboxes are often shown on the display area as a square box next to an item (the term "item" here referring to both text adjacent the check box describing or identifying the item, as well as the underlying item itself), and the square box can contain: 1) white space for false; or 2) a mark (e.g., a tick mark or x) for true. Inverting or toggling the state of a checkbox is done responsive to user input (e.g., by clicking the mouse on the box and/or item, using a keyboard shortcut). A checkbox list is a type of GUI widget that offers a series of checkboxes, each with a binary choice between two options, to allow the user to select one or more of the choices (that is, to select one or more of the items). While the checkboxes of a checkbox list are one form of visual indication of which items are currently selected, other types of such visual indications have been used (e.g., instead of the checkboxes, highlighting those items that are currently selected; not displaying any boxes, but still using white space and a mark to next to each (often to the left) item to visually indicate which items are currently selected).

BRIEF DESCRIPTION OF THE DRAWINGS

The invention may be understood by referring to the following description and accompanying drawings that are used to illustrate embodiments of the invention. In the drawings:

FIG. 4 is a screenshot illustrating a GUI widget of an exemplary application program according to an embodiment of the invention.

DESCRIPTION OF EMBODIMENTS

The following description describes methods and apparatuses for implementing graphical user interface widgets to select multiple items. In the following description, numerous specific details such as resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, logic implementations, opcodes, means to specify operands, and full software instruction sequences have not been shown in detail in order not to obscure the invention. Those of ordinary skill in the art, with the included descriptions, will be able to implement the invention without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

FIG. 1

Figure 1:
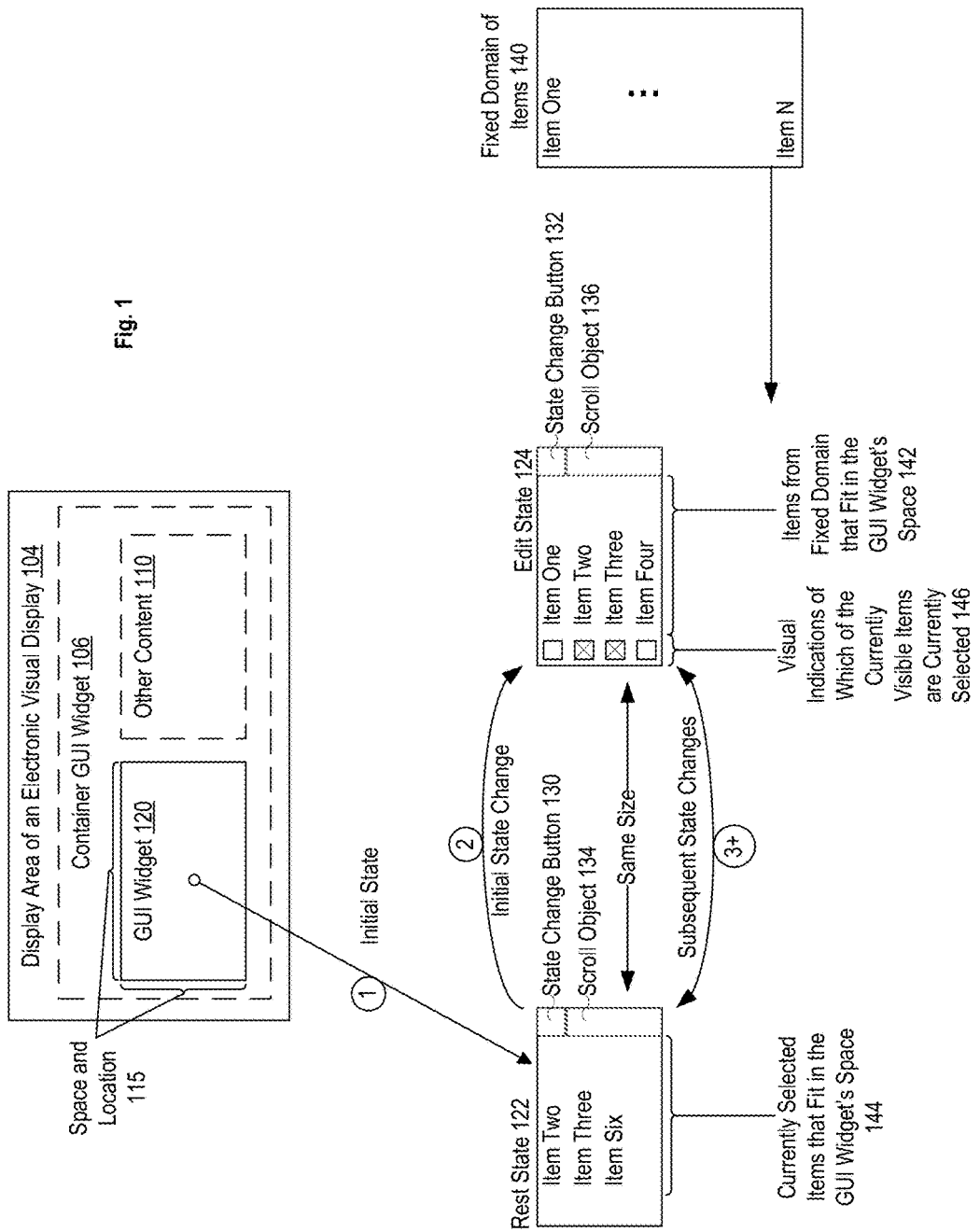
FIG. 1 is a block diagram illustrating the operation of a GUI widget, which allows a user to select multiple items from a fixed domain of items, according to some embodiments of the invention.

FIG. 1 is a block diagram illustrating the operation of a GUI widget, which allows a user to select multiple items from a fixed domain of items, according to some embodiments of the invention. FIG. 1 shows that a space at a location on a display area of an electronic visual display 104 is provided for displaying a GUI widget 120.

The GUI widget 120 has two basic states, and what is displayed by the GUI widget 120 is dependent upon its state. A line with a circled 1 illustrates that initially the GUI widget 120 is in a rest state 122; a line with a circled 2 illustrates that if there is an initial state change, it is from the rest state 122 to an edit state 124; and a line with a circled 3+ illustrates that if there are one or more subsequent state changes, they ping-pong between the edit state 124 and the rest state 122 (any such state changes typically end in the rest state 122). Exemplary contents for the rest state 122 and the edit state 124 are illustrated. Only the contents of one of the rest state 122 and the edit state 124 are shown within the space and location 115 at a time.

The GUI widget 120 allows a user to select multiple items from a fixed domain of items (while in the edit state 124) and that allows the user to easily recognize which of the items from the fixed domain are currently selected (while in the rest state 122). FIG. 1 illustrates an exemplary fixed domain of items 140 including "Item One" through "Item N." The fixed domain of items 140 represents a total set from which selections may be made. One or more data structures (not shown) are used to store the fixed domain of items 140, as well as each item's corresponding current state, which can be either the selected state or the unselected state (not shown). These data structures are themselves not made visible on the display area of the electronic visual display 104 using the GUI widget 120. Rather, the items and states from these data structures are selectively made visible through the GUI widget 120.

As illustrated, the size of the space for both the rest state 122 and the edit state 124 of the GUI widget 120 is the same. Based upon the size of the space provided to the GUI widget 120, a maximum number of the items may be simultaneously displayed (will fit) within the GUI widget's space (this is true for both the rest state 122 and the edit state 124). While in FIG. 1 this maximum number is 4, a smaller or larger number would be more appropriate depending upon the goal of the GUI widget 120. The selection of this maximum number is often an educated guess based upon the number of items most users are expected to select (and in some embodiments, the number is increased by one or two to provide for some "buffer").

The rest state 122 is a list state that visibly displays a current set of the items. The number of the items in the current set does not exceed the maximum number that will fit within the space of the GUI widget 120, and the current set of the items includes as many of the items that are currently selected from the fixed domain 140 that fit within the space of the GUI widget 120. Thus, the list state only displays those of the items from the fixed domain 140 that are currently selected such that those of the items from the fixed domain 140 that are not currently selected are not displayed. Any of the items that are currently selected from the fixed domain 140 that do not fit can be made visible responsive to user input that scrolls to change those of the items in the current set (one or more techniques may be enabled to receive user input indicating scrolling, including swiping, activation of a scroll object 134 such as a scrollbar (shown in a dashed box to show it is optional, and if present may optionally be present only when there are more currently selected items than the maximum number that will fit within the space of the GUI widget 120)). While in one embodiment the list state is displayed in a read only mode such that user input relative to the items currently displayed is ignored, alternative embodiments may allow for some form(s) of interaction.

The edit state 124 is a multi-item selection list state that: 1) displays as many of the items from the fixed domain 140 that fit within the space of the GUI widget 120; and 2) displays visual indications of which of the items currently displayed are currently selected 146. For the former, the example from FIG. 1 shows that the four items from the fixed domain currently made visible in the GUI widget's space are "Item One," "Item Two," "Item Three," and "Item Four." Any of the items from the fixed domain 140 that do not fit can be made visible responsive to user input that scrolls to change those of the items being currently displayed (one or more techniques may be enabled to receive user input indicating scrolling, including swiping, activation of a scroll object 136 such as a scrollbar (shown in a dashed box to show it is optional, and if present may optionally be present only when there are more currently selected items than the maximum number that will fit within the space of the GUI widget 120)).

For the visual indications of which of the items currently displayed are currently selected 146, FIG. 1 illustrates the use of check boxes to the left of each of the currently displayed items, and an X mark within those of the check boxes corresponding to the currently selected ones of the items ("Item Two" and "Item Three"). Alternative embodiments of the invention may use other types of visual indications ((e.g., instead of the checkboxes, highlighting or otherwise altering the text (e.g., italicize, bold) the text of the items that are currently selected; not displaying any boxes, but still using white space and a mark next to each (e.g., to the left) of each item to visually indicate which items are currently selected; instead of a x mark, a tick mark). The visual indications may be toggled between a selected state and an unselected state responsive to user input. Any such toggling changes which of the items from the fixed domain 140 are currently selected (in one embodiment, this will be tracked in the previously mentioned set of data structures), and such changes will be reflected in the items displayable in the rest state 122 if and when the GUI widget 120 is transitioned back to the rest state 122 (e.g., if user input is received, relative to the illustrated example, that unselects "Item Two" and selects each of "Item Seven," "Item Eight," and "Item N," then one embodiment displays "Item Three," "Item Six," "Item Seven," and "Item Eight" and does not display displayable "Item N" because only four item fit at a time in the space of the GUI widget 120).

Thus, the displayable items while in the edit state 124 are all of the items of the fixed domain of items 140, while the displayable item in the rest state are only those of the items from the fixed domain of items 140 that are currently selected (that are currently in the selected state). In the example of FIG. 1 where the maximum number of displayed items is 4, only 4 of the displayable items will be displayed at a time by the GUI widget 120. Also, the GUI widget 120 may be placed inside a container GUI widget 106 along with other content 110 (illustrated by dashed boxes).

As discussed above, only one of the rest state 122 and the edit state 124 is made visible as the GUI widget 120 at a time; and as illustrated, the space and location 115 of the GUI widget 120 is the same regardless of whether the GUI widget 120 is currently in the rest state 122 or the edit state 124. Thus, transitioning from the rest state 122 to the edit state 124 requires transitioning to displaying the GUI widget 120 in the edit state 124 taking up the same space at the same location 115 within the display area of the electronic visual display 104 as the GUI widget 120 did when it was in the rest state 122 (in other words, the GUI widget 120 is not resized even though there will typically be more displayable items (all of the items in the fixed domain 140) in the edit state 124 than in the rest state 122). The reverse is true as well, and thus the GUI widget 120 is not resized when transitioning from the edit state 124 to the rest state 122 even though there will typically be less displayable items (only the currently selected items from the fixed domain 140) to display in the rest state 122 than in the edit state 124. Thus, the edit state 124 does not require any more "real estate" on the screen than the rest state 122, and transitioning between states does not cause any other content (e.g., other content 110 and/or content outside of the container GUI widget 106) at other locations within the display area to be made non-visible (covered up) because the edit state takes up the same space at the same location as the rest state. Further, the transitioning between these states is done without use of other GUI widgets (such as a dialogue box, a popup window, or a popup menu) so as to avoid making other content (e.g., other content 110 and/or content outside of the container GUI widget 106) at other locations within the display area to be made non-visible.

While the space at the location 115 is only part of the display area of the electronic visual display 104, the given space at the location within the display area of the electronic visual display 104 allocated to a GUI widget (such as the GUI widget 120 or the container GUI widget 106) may be all of the display. Also, some embodiments of the invention allow the GUI widget 120 (or the container GUI widget 106) to be moved (i.e., to change the location) on the display area (e.g., through dragging) and/or allow the container GUI widget 106 to be resized, which can result in the GUI widget 120 being only partially visible. For instance, while the space and location 115 is illustrated as being sufficient to display the entire GUI widget 120 (FIG. 1 also illustrates there is sufficient space for the container GUI widget 106 and its other content 110), when and if the space is too small for the GUI widget 120 then the entire GUI widget 120 will not be visible at one time (typically, the user scrolls in order to change which parts of the GUI widget and/or its contents are currently visible). If the GUI widget 120 is put inside the container GUI widget 106, the "internal" GUI widget 120 is provided a space at a location within the container GUI widget 106; and while at least some part of the GUI widget 120 is visible, the space at the location within the container GUI widget 106 provided the container GUI widget 106 corresponds to a space at the location within the display area of the electronic visual display 104.

One advantage of the GUI widget 120 is that upon a transition, the only item in the display area of electronic visual display 104 that needs to change is the GUI widget 120, and this change occurs in place on the display area of the electronic visual display 104; thus, the user does not have to experience the disruption/interruption in work flow caused by a pop-up GUI widget or a resizing of the GUI widget 120 (which may require a change in the user's attention to a different and/or additional location on the display area and at diferent content that was not part of what was previously displayed).

Also, where the maximum number of the items that may be simultaneously displayed (will fit) within the GUI widget's space is large enough to accommodate all of the currently selected items, the rest state 122 allows a user to visually scan the GUI widget 120 to determine which of the items from the fixed domain 140 are currently selected (the user need not interact with the with the GUI widget 120 to see what items are currently selected). Even if there are more than the maximum number of displayable items currently selected, a user can more easily review the currently selected items through scrolling in the rest state 122 because only the currently selected items are displayable items (as opposed to in the edit state 124 in which the user may have to scroll through all of the items from the fixed domain 140 to see which are currently selected).

Another advantage of the GUI widget 120 is that its initial state is the rest state 122, and the edit state 124 is on demand. Often, a GUI widget is viewed to determine what items are currently selected, and the selections are not changed; in these situations, it is advantageous that the GUI widget 120's initial state is the rest state 122 because it is simpler and cleaner than the edit state 124. Further, where the GUI widget 120 is placed within the container GUI widget 106 with other content 110 (which may be one or more other GUI widgets, some or all of which allow for user interaction), the user may be viewing the container GUI widget 106 for purposes other than changing the items selected by the GUI widget 120; and thus, having the GUI widget 120's initial state be the simpler and cleaner rest state 122 is advantageous.

In some embodiments of the invention the selection states of the items in the fixed domain of items 140 are preconfigured (defaulted) to have some, but not all, of the items currently selected. In the case where only some of the items are preconfigured to be currently selected (e.g., the items preconfigured as currently selected are often chosen to be less than the maximum number discussed above and those most often selected), the GUI widget 120 when initially viewed in the rest state 122 has items displayed. In contrast, the case where none of the items are preconfigured to be currently selected, the GUI widget 120 when initially viewed in the rest state 122 does not display any items (different embodiments may handle this situation different, including displaying white space, an indication that no items are currently selected (e.g., "none," "Please make selections", "Click here to make selections," etc.)).

Since other type of GUI widgets for selecting multiple items previously exist, users will expect these pre-existing GUI widgets to be used. As such, use of the GUI widget 120 will be an unexpected result of executing an application which uses the GUI widget 120. However, from the users' perspective, overcoming the learning curve of the GUI widget 120 will leave them with the unexpected result of preferring the GUI widget 120 because of the advantages described herein.

One or more mechanisms may be implemented that each enable a different kind of user input to cause transitions between the rest state 122 and the edit state 124. In fact, where each of a first set of one or more mechanisms is implemented to cause a transition from the rest state 122 to the edit state 124, and where each of a second set of one or more mechanisms is implemented to cause a transition from the rest state 122 to the edit state 124, the first and second sets may be the same or different for different embodiments of the invention (e.g., one of the sets may be a subset of the other, the sets may be mutually exclusive, the sets may overlap). In certain embodiments, both the first and second sets of mechanisms require an explicit action by the user (as opposed to an implicit action, such as mousing over the GUI widget 120). For example, in certain embodiments of the invention, both the first and second set includes a state change button that when activated through user input cause a state change; while FIG. 1 illustrates a state change button 130 and a state change button 132 with a dashed box in the upper right-hand corners respectively of the rest state 122 in the edit state 124, different embodiments may place these state change buttons in other locations and/or support such a state change button in only one of the rest state 122 and the edit state 124. While the state change button 130 and the state change button 132 may look the same, they look different in different embodiments of the invention (e.g., the state change button 130 may show a pencil, while the state change button 132 may show a symbol indicating close (e.g., a box with an X in it, a red circle).

Certain embodiments include in the first set of mechanisms a user interaction within the GUI widget 120 (e.g., a tap, a double tap, a click, a double click, a right click) and include in the second set of mechanisms a user interaction outside of the GUI widget 120 (e.g., a tap, at double tap, a click, a double click, a right click). The former indicating that focus is on the GUI widget 120, and the latter indicating a change in focus away from the GUI widget 120.

One specific embodiment supports in the first set only the state change button 130, and in the second set both the state change button 132 and a user interaction outside of the GUI widget 120.

FIG. 2

Figure 2:
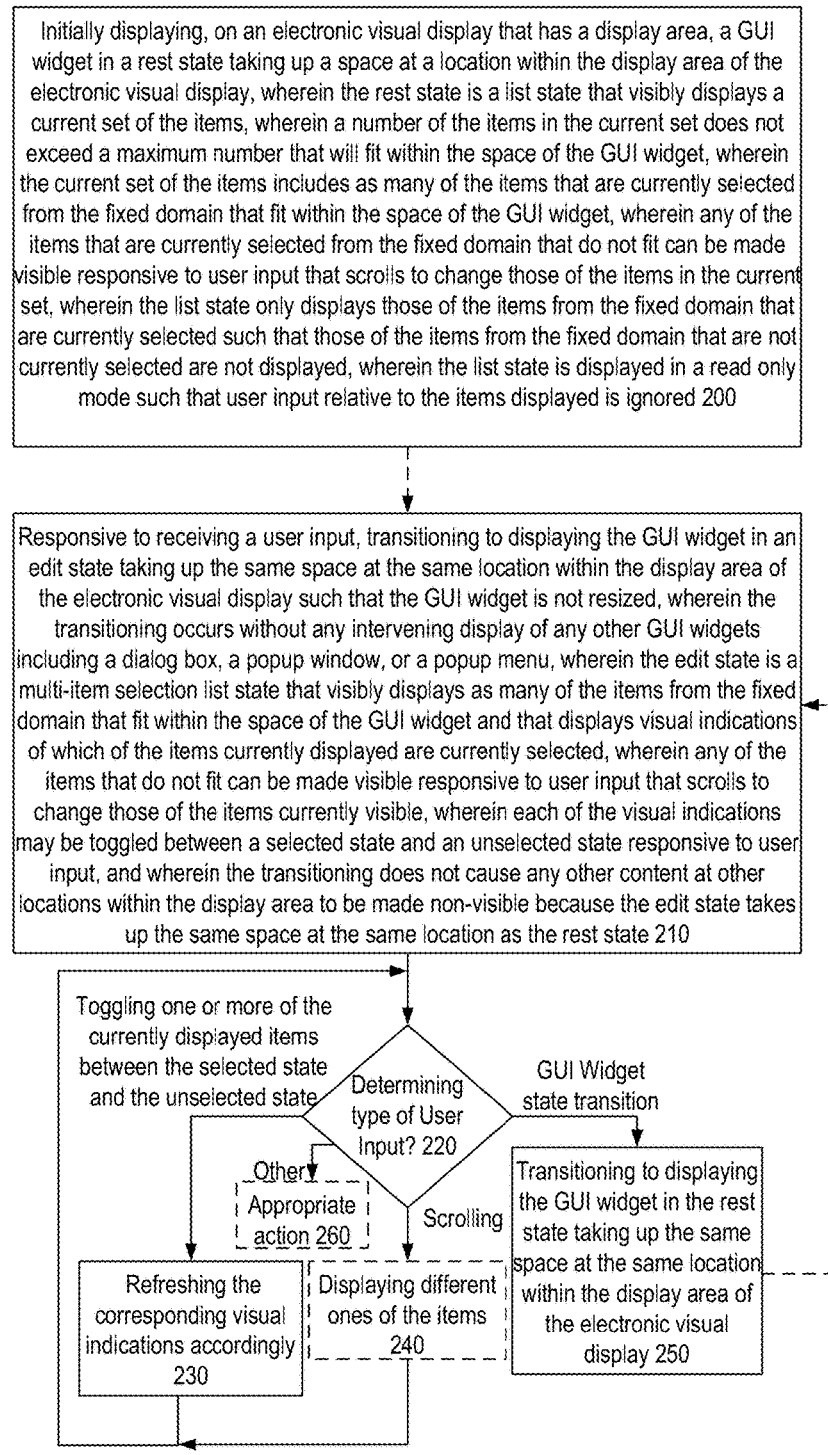
FIG. 2 is a flow diagram illustrating the operation of a GUI widget, which allows a user to select multiple items from a fixed domain of items, according to some embodiments of the invention.

FIG. 2 is a flow diagram illustrating the operation of a GUI widget, which allows a user to select multiple items from a fixed domain of items, according to some embodiments of the invention. The operations in the flow diagram will be described with reference to the exemplary embodiments of FIG. 1. However, it should be understood that the operations of the flow diagram can be performed by embodiments of the invention other than those discussed with reference to FIG. 1, and the embodiments of the invention discussed with reference to FIG. 1 can perform operations different than those discussed with reference to the flow diagram of FIG. 2.

At block 200 of FIG. 2, a GUI widget is initially displayed, on an electronic visual display that has a display area, in a rest state taking up a space at a location within the display area of the electronic visual display. With reference of FIG. 1, this would be GUI widget 120 in the rest state 122. The rest state is a list state that visibly displays a current set of the items, wherein the number of the items in the current set does not exceed a maximum number that will fit within the space of the GUI widget. The current set of the items includes as many of the items that are currently selected from the fixed domain that fit within the space of the GUI widget, and any of the items that are currently selected from the fixed domain that do not fit can be made visible responsive to user input that scrolls to change those of the items in the current set. The list state only displays those of the items from the fixed domain that are currently selected such that those of the items from the fixed domain that are not currently selected are not displayed. While in the list state, the displayed items are in a read only mode such that user input relative to the items displayed is ignored.

At this point in the flow, the user may choose not to interact with the GUI widget, or interact with it only to the extent the user reads the items currently displayed in the rest state. As a result, flow from block 200 is illustrated with a dashed line to indicate it is optional dependent upon the action of the user. Assuming the user chooses to interact with the GUI widget, flow passes from block 200 to 210.

As shown in block 210, responsive to receiving user input, the GUI widget is transitioned to displaying an edit state taking up the same space at the same location within the display area of the electronic visual display such that the GUI widget is not resized. With reference of FIG. 1, this would be GUI widget 120's initial state change to the edit state 124. The transitioning occurs without any intervening display of any other GUI widgets including a dialog box, a popup window, or a popup menu. The edit state is a multi-item selection list state that: 1) visibly displays as many of the items from the fixed domain that fit within the space of the GUI widget; and 2) displays visual indications of which of the items currently displayed are currently selected, where any of the items that do not fit can be made visible responsive to user input that scrolls to change those of the items currently visible. Each of the visual indications may be toggled between a selected state and an unselected state responsive to user input. The transitioning does not cause any other content at other locations within the display area to be made non-visible because the edit state takes up the same space at the same location as the rest state. From block 210 flow passes to block 220.

In block 220, the user provides additional input and it is determined what type of input relative to the GUI widget the user has provided. While in FIG. 2 four types of user input are shown, other embodiments may support more or less types of user input.

The first type of user input is a toggling of one or more of the currently displayed items between the selected state and the unselected state, which causes flow to pass to block 230 where the corresponding visual indications are refreshed to reflect the changes in the selection(s). From block 230, flow returns to block 220.

The second type of user input is scrolling, which causes flow to pass to block 240 where different ones of the items are displayed as a result of the scrolling action. From block 240, flow returns to block 220.

The third type of user input indicates the user wishes the GUI widget to perform a state transition to the rest state, and this user input causes flow to pass to block 250 at which the GUI widget is transitioned to displaying in the rest state taking up the same space at the same location within the display area of the electronic visual display. Similar to block 200, at this point in the flow, the user may choose not to interact further with the GUI widget, or interact with it only to the extent the user reads the items currently displayed in the rest state. As a result, flow from block 250 is illustrated with a dashed line to indicate it is optional dependent upon the action of the user. Assuming the user chooses to interact with the GUI widget, flow passes from block 250 to 210.

The fourth type of user input is illustrated as other, and this user input causes flow to pass to block 260 where the appropriate action is taken. By way of example with reference to FIG. 1, if the GUI widget 120 was placed within the container GUI widget 106, and the user input was too close the container GUI widget 106, the appropriate action would be to close the container GUI widget 106 which would also close the GUI widget 120.

FIGS. 3A-3B

Figure 3A:
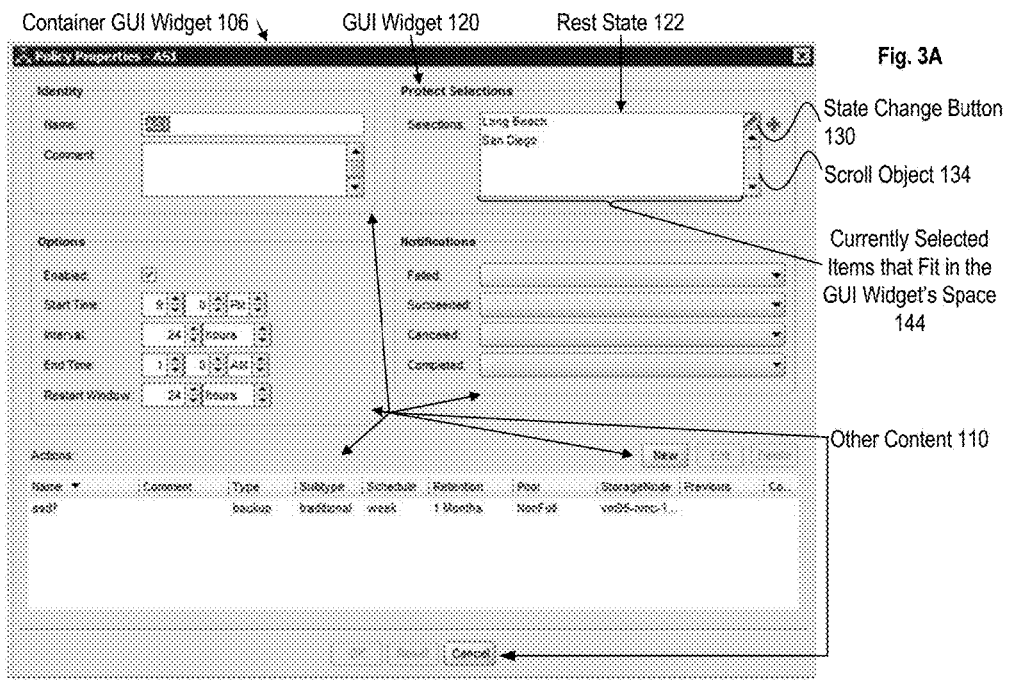
FIG. 3A is a screenshot from an exemplary application program with a GUI widget in the rest state according to one embodiment of the invention.
Figure 3B:
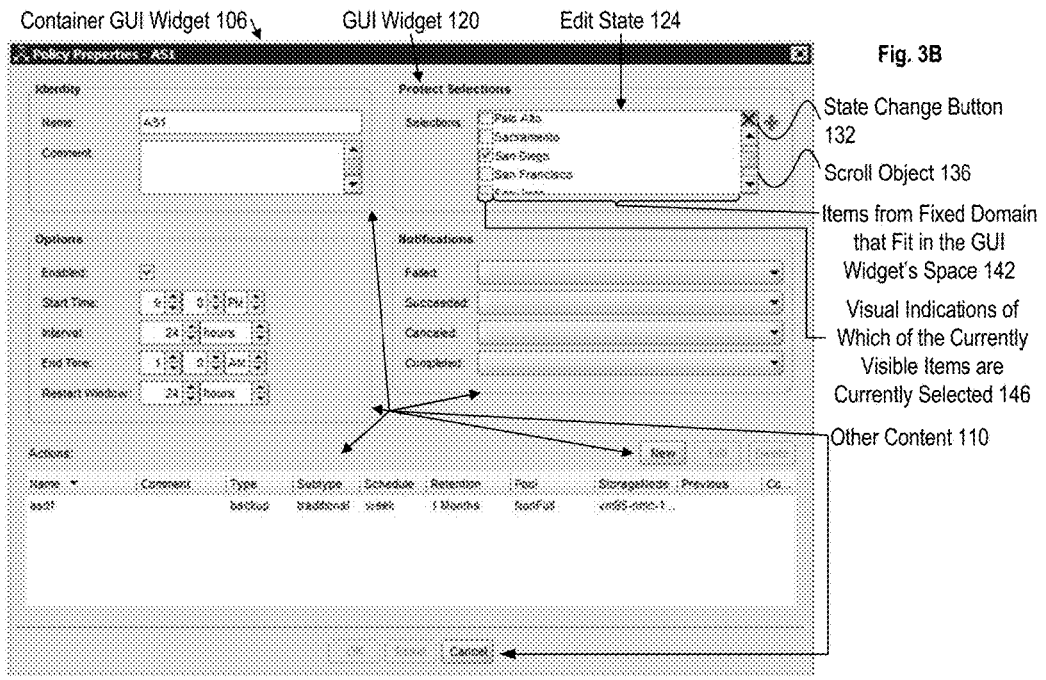
FIG. 3B is a screenshot from the exemplary application program after the GUI widget has been transitioned to the edit state according to one embodiment of the invention.

FIG. 3A is a screenshot from an exemplary application program with a GUI widget in the rest state according to one embodiment of the invention; while FIG. 3B is a screenshot from the exemplary application program after the GUI widget has been transitioned to the edit state according to one embodiment of the invention. Although the GUI elements of FIGS. 3A and 3B are not the identical elements from FIG. 1 (e.g., elements have been rearranged and captions have been included), the reference numbers from FIG. 1 have been reused to FIGS. 3A and 3B to illustrate elements with the same or similar functionality.

Both screenshots show a container GUI widget 106 including other content 110 (specifically, four GUI widgets captioned Identity, Options, Notifications, and Action, as well as several button GUI widgets) and a GUI widget 120 captioned Product Selections. In FIG. 3A, the GUI widget 120 includes a state change button 130 (illustrating a pencil) and a scroll object 134 (a scrollbar), and is in a rest state 122 displaying "Long Beach" and "San Diego" as the currently selected items that fit in the GUI widget's space 144. In FIG. 3B, the GUI widget 120 includes a state change button 132 (illustrated as an X and being a close button) and a scroll object 136 (a scrollbar), and is in an edit state 124 displaying: 1) "Palo Alto," "Sacramento," "San Diego," "San Francisco," and the top part of "San Jose" as the items from the fixed domain that fit in the GUI widget's space 142; and 2) check boxes to the left of each of the items as the visual indications of which of the currently visible items are currently selected 146 (specifically, only the checkbox corresponding to "San Diego" has a checkmark inside indicating it is the only one of the currently selected items of the currently visible items).

Each selection in the Product Selections is a collection of "hosts" (e.g., laptops, desktops, servers); specifically, the hosts are grouped into different Selections. The GUI widgets within the container GUI widget 106 each allow for the configuration of an aspect (a policy) of a service (backup); and the GUI widgets within the container GUI widget 106 collectively allow for the simultaneous display of the user selectable configurations for the service.

As described with reference to FIG. 1, since the initial state of the GUI widget 120 is the rest state 122, the user can easily read the currently selected items ("Long Beach" and "San Diego"). If this is sufficient for the user's purposes, then the user need not interact with the GUI widget 120 to know these are the currently selected items. However, if the user wishes to consider making more, less, or different selections, then the user can interact with the GUI widget by triggering the state change button 130, responsive to which the GUI widget 120 transitions to the edit state 124 reflected in FIG. 3B. In FIG. 3B, the user can interact by causes the GUI widget to scroll through all of the possible selections, to change the selections, and to cause a transition back to the rest state 122. Thus, the above discussed advantages apply to the screenshots of the exemplary application program.

FIG. 4

FIG. 4 is a screenshot illustrating a GUI widget of an exemplary application program according to an embodiment of the invention. FIG. 4 illustrates the GUI widget in the rest state, and one of ordinary skill in the art would know what the GUI widget in an edit state would look like based upon FIGS. 1 and 3B and the associated description. Although the GUI elements of FIG. 4 are not the identical elements from FIG. 1 (e.g., elements have been rearranged and captions have been included), the reference numbers from FIG. 1 have been reused to FIG. 4 to illustrate elements with the same or similar functionality.

FIG. 4 illustrates a container GUI widget 106 including: 1) a left side captioned "Filters," a GUI widget captioned Policies, and a GUI widget 120 captioned Selections; and 2) on the right side a table with columns labeled Name, Policies, Selections, Scheduled backup, and Save set and with rows having example content accessed from a database. The content of the container GUI widget 106 other than the GUI widget 120 is labeled other content 110. In FIG. 4, the GUI widget 120 includes a state change button 130 (illustrating a pencil) and a scroll object 134 (a scrollbar), and is in a rest state 122 displaying "Long Beach" and "San Diego" as the currently selected items that fit in the GUI widget's space 144.

The currently selected items in the GUI widget 120 (as well as the GUI widget captioned Policies) are used to filter which rows of the database are currently displayable in the table. Specifically, the GUI widget 120 captioned "Selections" operates to filter on the "Selections" column, and the GUI widget captioned "Policies" operates to filter on the "Policies column." Responsive to receiving user input indicating a desire to transition the GUI widget 120 to the edit state, the GUI widget 120 would be transitioned; and responsive to receiving user input that changes which of the items are currently selected (adding and/or removing items from the Selections), the table filtered by on the currently selected items would be refreshed (e.g., the database would be filtered based on the now currently selected items and the table refreshed to add/remove rows of the database from the table). Thus, in addition to the advantages previously described, the GUI widget 120 of FIG. 4 has the advantage that the result of the changes in the currently selected items with GUI widget 120 are simultaneously reflected in the table, In other words, the ability of the GUI widget 120 to be in the rest state allows for a visual scan by the user as previously described, while the transition from the rest state to the edits state using the same space at the same location avoids: 1) covering up other content (e.g., the table) reflecting the results of changing the selection—this would not be trued if a pop-up window, dialog box, or pop-up menu that covered part of the table were used; and 2) covering up other GUI widgets acting as filters (e.g., the GUI widget captioned Policies) and vice versa.

While the examples of the GUI widget 120 illustrated herein are generally designed according to a WIMP paradigm, it should be clear that one of ordinary skill in the art would understand how to design according to a post-WIMP paradigm based on FIG. 1.

FIG. 5

An electronic device stores and transmits (internally and/ or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals with wired or wireless connections) with other electronic devices. One or more parts of an embodiment of the invention may be implemented using different combinations of software, firmware, and/or hardware.

Figure 5:
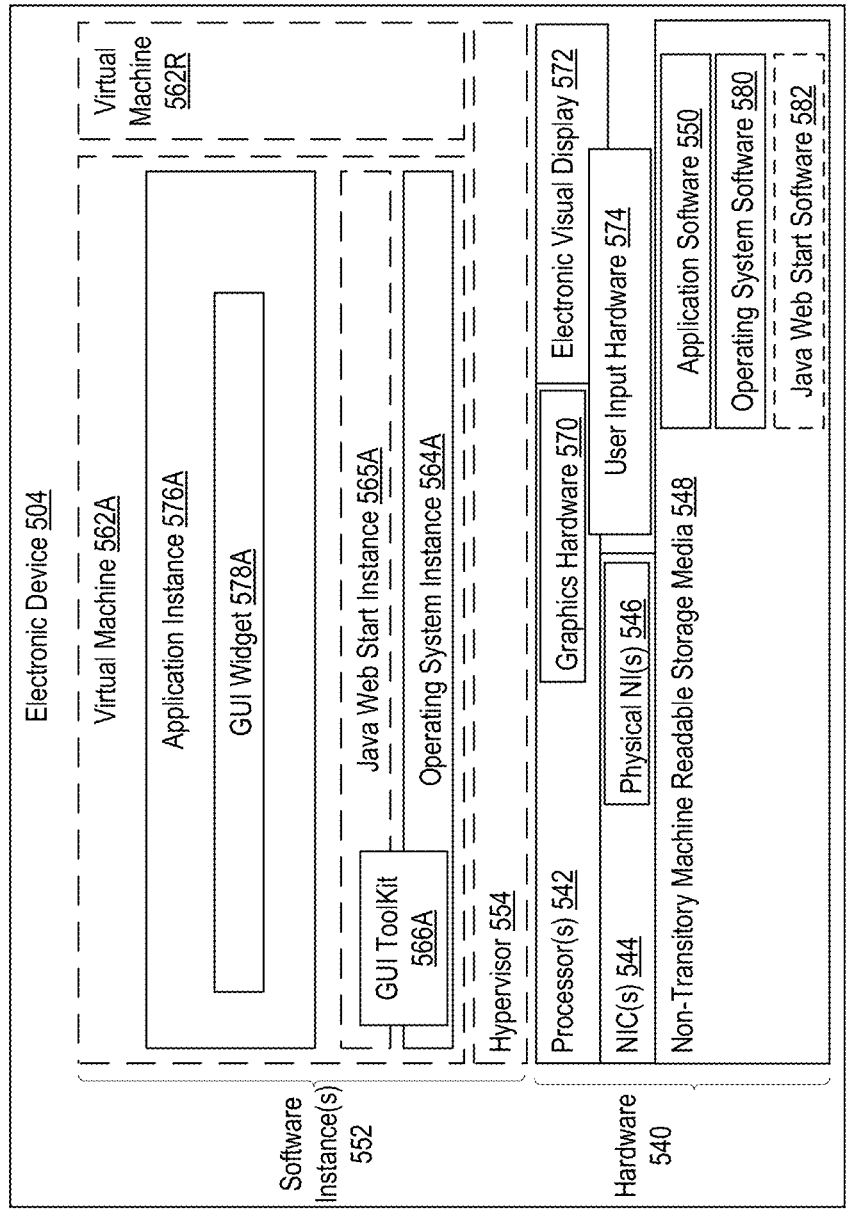
FIG. 5 is a block diagram illustrating an exemplary electronic device operative to display the GUI widget, which allows a user to select multiple items from a fixed domain of items, according to some embodiments of the invention.

FIG. 5 is a block diagram illustrating an exemplary electronic device operative to display the GUI widget, which allows a user to select multiple items from a fixed domain of items, according to some embodiments of the invention. While FIG. 5 shows an architecture for an electronic device 504 representative of a variety of types of electronic devices (workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances, in-vehicle entertainment systems), other architectures are well known in the art.

The electronic device 504 includes hardware 540 comprising a set of one or more processor(s) 542 (including graphics hardware 570), an electronic visual display 572 (which may be an liquid crystal display screen, a projector, etc.) driven by the graphics hardware 570, user input hardware 574 (shown overlapping the electronic visual display 572 since this could include a touch screen and/or camera, as well as a pointer device(s) and/or a keyboard(s)), and network interface controller(s) 544 (NICs; also known as network interface cards) (which include physical network interface(s) 546), as well as non-transitory machine readable storage media 548 having stored therein application software 550, operating system software 580 and optionally Java™ Web Start Software 582 (manufactured by Oracle® Corporation of Redwood City, Calif.).

FIG. 5 also illustrates that when the power is supplied to the electronic device 504 and the device is on, the electronic device 504 is typically executing software and that executing software is represented as software instance(s) 552. In FIG. 5, the software instances 552 are shown as including the operating system instance 564A (an instance of the operating system software 580), optionally a Java Web Start Instance 565A (an instance of the Java Web Start software 582), a GUI toolkit 566A (which may be part of the operating system and/or the Java Web Start software 582), and an application instance 576A (an instance of the application software 550) (at least part of these running software instances are typically stored in volatile memory (not shown) as described above). A GUI widget 120 is shown within the application instance 576A to represent that execution of the application instance 576A causes, through interaction with the GUI toolkit 566A, the GUI widget 120 to be displayed on the electronic visual display 572. For instance, the application software 550 may be that of an application that generates the screenshots found in FIGS. 3A and 3B and/or FIG. 4.

In embodiments that use compute virtualization, the processor(s) 543 typically execute software to instantiate a hypervisor 554 (sometimes referred to as a virtual machine monitor (VMM)) and one or more virtual machines 562A-R that are run by the hypervisor 554; which would be part of the software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation the application instance 576A on top of the operating system instance 564A are typically executed within the virtual machine 562A. In embodiments where compute virtualization is not used, the application instance 576A on top of operating system instance 564A is executed on the "bare metal" of the electronic device 504.

The operating system instance 564A provides basic processing, input/output (I/O) (including receiving user input via the user input hardware 574, as well as displaying content through the graphics hardware 570 on the electronic visual display 572), and networking capabilities via the NIC(s) 544. The GUI toolkit 566A (also referred to as a widget library or widget toolkit) is a set of GUI widgets for use in designing applications with GUIs, and includes support for the GUI widget 120. The Java Web Start software 582 allows standalone Java software applications (e.g., application software 550 may be a standalone Java software application) to be downloaded over a network coupled to a physical NI 546. The Java Web Start software 582 ensures the most current version of the application is deployed, as well as the correct version of the Java Runtime Environment (JRE) (not shown).

Alternative embodiments may have stored in the non-transitory machine readable storage media 548 a web browser that implements a version of HTML (Hypertext Markup Language) which supports the GUI widget 120 and provides access thereto via an HTML tag; and HTML code accessed over the network and provided to the browser may include one or more such tags such that the GUI widget 120 is displayed. As opposed to such native support in the web browser, an alternative embodiment of the invention may include: 1) a third party web package which supports the GUI widget 120; or 2) require the HTML to include JavaScript that, when executed by a JavaScript engine of the Web browser, implements the GUI widget 120 (e.g., the JavaScript may cause the fixed domain of items to be accessed over the network, supervise interactions with the GUI widget 120).

Alternative Embodiments

While the flow diagrams in the figures show a particular order of operations performed by certain embodiments of the invention, it should be understood that such order is exemplary (e.g., alternative embodiments may perform the operations in a different order, separate certain operations, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of operating a graphical user interface (GUI) that allows a user to select multiple items from a fixed domain of items that represents a total set from which selections may be made and that visibly distinguishes which of the items of the fixed domain are currently selected, the method comprising:

initially displaying, on an electronic visual display that has a display area, a GUI widget in a rest state occupying a predetermined space at a predetermined location within the display area of the electronic visual display, wherein the rest state is a list state that visibly displays a current set of the items of the fixed domain that are currently selected, wherein a number of the items of the fixed domain in the current set does not exceed a maximum number that will fit within the predetermined space wherein any of the items of the fixed domain that are currently selected that exceed the maximum number that will fit within the predetermined space can be made visible responsive to a scrolling user input to scroll the current set of the items of the fixed domain, wherein the list state only displays the items of the fixed domain that are currently selected such that the items of the fixed domain that are not currently selected are not displayed, wherein the list state is displayed in a read only mode such that user input selections relative to the items of the fixed domain displayed in the list state are ignored;

responsive to receiving a first user input, transitioning to displaying the GUI widget in an edit state occupying the predetermined space at the predetermined location within the display area such that the GUI widget is not resized and the GUI widget is not moved, wherein the transitioning occurs without any intervening display of any other GUI widgets including a dialog box, a popup window, or a popup menu, wherein the edit state is a multi-item selection list state that visibly displays as many of the items of the fixed domain that fit within the predetermined space and that further displays visual indications that indicate which of the items of the fixed domain are currently selected, wherein any of the items of the fixed domain that do not fit within the predetermined space can be made visible responsive to a second scrolling user input to scroll the items of the fixed domain that are currently visible, wherein each of the visual indications may be toggled between a selected state and an unselected state responsive to user input selections, wherein the transitioning does not cause any other content at other locations within the display area to be made non-visible, and wherein the GUI widget in each of the rest state and the edit state is displayed with a single button that when activated by the user causes a transition to the other of the rest state and the edit state.

2. The method of claim 1, wherein the multi-item selection list state operates as a checkbox list, and wherein the visual indications include white space or a mark displayed next to each of the items of the fixed domain being displayed.

3. The method of claim 1, wherein the single button is an edit button in the rest state and a close button in the edit state.

4. The method of claim 1, wherein the GUI widget is a focus of control following the transitioning, and the method further comprises:
responsive to receiving a second user input, transitioning to displaying the GUI widget in the rest state.

5. The method of claim 4, wherein the second user input is a click outside of the GUI widget.

6. The method of claim 1, wherein:
the displaying the GUI widget in the rest state includes simultaneously displaying all of the items of the fixed domain that are currently selected because they do not exceed the maximum number that will fit within the predetermined space such that all of the items of the fixed domain that are currently selected are visible without scrolling; and
the transitioning comprises enabling scrolling of the multi-item selection list because a total number of items of the fixed domain exceeds the maximum number that will fit within the predetermined space.

7. The method of claim 1, further comprising:
displaying on the electronic visual display, in addition to the GUI widget, the following other content:
a second GUI widget into which the GUI widget was placed;
a plurality of other GUI widgets that were also placed in the second GUI widget, wherein the GUI widget and the plurality of other GUI widgets each allow for configuration of an aspect of a service, wherein the GUI widget and the plurality of other GUI widgets collectively allow for the simultaneous display of the user selectable configurations for the service.

8. The method of claim 1, further comprising:
initially displaying on the electronic visual display, in addition the GUI widget, a table filtered based on the currently selected ones of the items of the fixed domain;
responsive to receiving a third user input that changes which of the items of the fixed domain are currently selected, refreshing the table filtered by on the currently selected ones of the items of the fixed domain.

9. An article of manufacture comprising:
a non-transitory machine-readable storage medium that provides instructions that, when executed by a processor, cause the processor to perform operations comprising,
initially displaying, on an electronic visual display that has a display area, a GUI widget in a rest state occupying a predetermined space at a predetermined location within the display area of the electronic visual display, wherein the rest state is a list state that visibly displays a current set of items of a fixed domain that are currently selected, wherein a number of the items of the fixed domain in the current set does not exceed a maximum number that will fit within the predetermined space, wherein any of the items of the fixed domain that are currently selected that exceed the maximum number that will fit within the predetermined space can be made visible responsive to a scrolling user input to scroll the current set of the items of the fixed domain, wherein the list state only displays the items of the fixed domain that are currently selected such that the items of the fixed domain that are not currently selected are not displayed, wherein the list state is displayed in a read only mode such that user input selections relative to the items of the fixed domain displayed in the list state are ignored;
responsive to receiving a first user input, transitioning to displaying the GUI widget in an edit state occupying the predetermined space at the predetermined location within the display area such that the GUI widget is not resized and the GUI widget is not moved, wherein the transitioning occurs without any intervening display of any other GUI widgets including a dialog box, a popup window, or a popup menu, wherein the edit state is a multi-item selection list state that visibly displays as many of the items of the fixed domain that fit within the predetermined space and that further displays visual indications that indicate which of the items of the fixed domain are currently selected, wherein any of the items of the fixed domain that do not fit within the predetermined space can be made visible responsive to a second scrolling user input to scroll the items of the fixed domain that are currently visible, wherein each of the visual indications may be toggled between a selected state and an unselected state responsive to user input selections, wherein the transitioning does not cause any other content at other locations within the display area to be made non-visible, and
wherein the GUI widget in each of the rest state and the edit state is displayed with a single button that when activated by the user causes a transition to the other of the rest state and the edit state.

10. The article of manufacture of claim 9, wherein the multi-item selection list state operates as a checkbox list, and wherein the visual indications include white space or a mark displayed next to each of the items of the fixed domain being displayed.

11. The article of manufacture of claim 9, wherein the single button is an edit button in the rest state and a close button in the edit state.

12. The article of manufacture of claim 9, wherein the GUI widget is a focus of control following the transitioning, and the operations further comprises:
responsive to receiving a second user input, transitioning to displaying the GUI widget in the rest state.

13. The article of manufacture of claim 12, wherein the second user input is a click outside of the GUI widget.

14. The article of manufacture of claim 9, wherein:
the displaying the GUI widget in the rest state includes simultaneously displaying all of the items of the fixed domain that are currently selected because they do not exceed the maximum number that will fit within the predetermined space such that all of the items of the fixed domain that are currently selected are visible without scrolling; and
the transitioning comprises enabling scrolling of the multi-item selection list because a total number of items of the fixed domain exceeds the maximum number that will fit within the predetermined space.

15. The article of manufacture of claim 9, the operations further comprising:
displaying on the electronic visual display, in addition to the GUI widget, the following other content:
a second GUI widget into which the GUI widget was placed;

a plurality of other GUI widgets that were also placed in the second GUI widget, wherein the GUI widget and the plurality of other GUI widgets each allow for configuration of an aspect of a service, wherein the GUI widget and the plurality of other GUI widgets collectively allow for the simultaneous display of the user selectable configurations for the service.

16. The article of manufacture of claim 9, the operations further comprising:
   initially displaying on the electronic visual display, in addition the GUI widget, a table filtered based on the currently selected ones of the items of the fixed domain;
   responsive to receiving a third user input that changes which of the items of the fixed domain are currently selected, refreshing the table filtered by on the currently selected ones of the items of the fixed domain.

17. An electronic device comprising:
   an electronic visual display that has a display area;
   a processor coupled to the electronic visual display;
   a non-transitory machine-readable storage containing instructions, which when executed by the processor, cause the electronic device to,
      initially display a GUI widget in a rest state occupying a predetermined space at a predetermined location within the display area of the electronic visual display, wherein the rest state is a list state that visibly displays a current set of items of a fixed domain that are currently selected, wherein a number of the items of the fixed domain in the current set does not exceed a maximum number that will fit within the predetermined space, wherein any of the items of the fixed domain that are currently selected that exceed the maximum number that will fit within the predetermined space can be made visible responsive to a scrolling user input to scroll the current set of the items of the fixed domain, wherein the list state only displays the items of the fixed domain that are currently selected such that the items of the fixed domain that are not currently selected are not displayed, wherein the list state is displayed in a read only mode such that user input selections relative to the items of the fixed domain displayed in the list state are ignored;
      responsive to receipt of a first user input, transition to display the GUI widget in an edit state occupying the predetermined space at the predetermined location within the display area such that the GUI widget is not resized and the GUI widget is not moved, wherein the transitioning occurs without any intervening display of any other GUI widgets including a dialog box, a popup window, or a popup menu, wherein the edit state is a multi-item selection list state that visibly displays as many of the items of the fixed domain that fit within the predetermined space and that further displays visual indications that indicate which of the items of the fixed domain are currently selected, wherein any of the items of the fixed domain that do not fit within the predetermined space can be made visible responsive to a second scrolling user input to scroll the items of the fixed domain that are currently visible, wherein each of the visual indications may be toggled between a selected state and an unselected state responsive to user input selections, wherein the transitioning does not cause any other content at other locations within the display area to be made non-visible, and
      wherein the GUI widget in each of the rest state and the edit state is displayed with a single button that when activated by the user causes a transition to the other of the rest state and the edit state.

18. The electronic device of claim 17, wherein the multi-item selection list state operates as a checkbox list, and wherein the visual indications include white space or a mark displayed next to each of the items of the fixed domain being displayed.

19. The electronic device of claim 17, wherein the single button is an edit button in the rest state and a close button in the edit state.

20. The electronic device of claim 17, wherein the GUI widget is a focus of control following the transitioning, and the instructions, when executed by the processor, also cause the electronic device to:
   responsive to receipt of a second user input, transitioning to displaying the GUI widget in the rest state.

21. The electronic device of claim 20, wherein the second user input is a click outside of the GUI widget.

22. The electronic device of claim 17, wherein:
   the display of the GUI widget in the rest state includes simultaneous display of all of the items of the fixed domain that are currently selected because they do not exceed the maximum number that will fit within the predetermined space such that all of the items of the fixed domain are that currently selected are visible without scrolling; and
   the transition comprises enablement of scrolling of the multi-item selection list because a total number of items of the fixed domain exceeds the maximum number that will fit within the predetermined space.

23. The electronic device of claim 17, wherein the instructions, when executed by the processor, also cause the electronic device to:
   display on the electronic visual display, in addition to the GUI widget, the following other content:
      a second GUI widget into which the GUI widget was placed;
      a plurality of other GUI widgets that were also placed in the second GUI widget, wherein the GUI widget and the plurality of other GUI widgets each allow for configuration of an aspect of a service, wherein the GUI widget and the plurality of other GUI widgets collectively allow for the simultaneous display of the user selectable configurations for the service.

24. The electronic device of claim 17, wherein the instructions, when executed by the processor, also cause the electronic device to:
   initially display on the electronic visual display, in addition the GUI widget, a table filtered based on the currently selected ones of the items of the fixed domain;
   responsive to receipt of a third user input that changes which of the items of the fixed domain are currently selected, refresh the table filtered by on the currently selected ones of the items of the fixed domain.

* * * * *